United States Patent
Grande Damaso

(10) Patent No.: US 6,460,368 B1
(45) Date of Patent: Oct. 8, 2002

(54) MAGNETIC DRIVE FOR AN ICING MACHINE SCRAPING BLADE

(76) Inventor: Alfonso Fabian Grande Damaso, Alqueria del Gat Street n° 17, 46128 Port- Saplaya-Alboraya (Valencia) (ES)

( * ) Notice: Subject to any disclaimer, the term of this patent is extended or adjusted under 35 U.S.C. 154(b) by 0 days.

(21) Appl. No.: 09/985,194

(22) Filed: Nov. 1, 2001

(30) Foreign Application Priority Data

May 30, 2001 (ES) ..................................... 200101398 U

(51) Int. Cl.[7] .................................................. F25C 1/18
(52) U.S. Cl. ........................................ 62/342; 366/273
(58) Field of Search ......................... 62/342, 343, 354, 62/381, 136; 366/273, 274

(56) References Cited

U.S. PATENT DOCUMENTS

| | | | | |
|---|---|---|---|---|
| 2,670,937 A | * | 3/1954 | Truesdell | 366/149 |
| 2,671,646 A | * | 3/1954 | Lindsey | 241/166 |
| 3,818,716 A | * | 6/1974 | Carpigiani | 426/519 |
| 3,952,538 A | * | 4/1976 | Warlick | 366/144 |
| 4,802,407 A | * | 2/1989 | Negri et al. | 366/145 |
| 5,312,184 A | * | 5/1994 | Cocchi | 366/302 |
| 5,644,927 A | * | 7/1997 | Tatematsu et al. | 62/354 |
| 6,041,614 A | * | 3/2000 | Yamaya et al. | 165/61 |
| 6,082,123 A | * | 7/2000 | Johnson | 366/311 |
| 6,095,677 A | * | 8/2000 | Karkos et al. | 366/274 |

FOREIGN PATENT DOCUMENTS

EP 0479243 A1 * 8/1992 ............. F25C/1/14

* cited by examiner

Primary Examiner—William E. Tapolcai
Assistant Examiner—Mohammad M. Ali
(74) Attorney, Agent, or Firm—Staas & Halsey LLP

(57) ABSTRACT

An icing machine including a horizontal evaporator, an axle extending internally through the evaporator and coupled, at one end, to a motor reducer, and a magnetic clutch connected in watertight relation between the other end of the axle and a scraping blade on the outside of the evaporator. The clutch includes a primary cylindrical rotor connected to the axle and including a magnet, and an external secondary cylindrical rotor also including a magnet and encircling the primary rotor, both rotors being magnetically coupled, and the inside of the evaporator and the axle remain watertight.

19 Claims, 3 Drawing Sheets

MAGNETIC DRIVE FOR AN ICING MACHINE SCRAPING BLADE

CROSS REFERENCE TO RELATED APPLICATION

This application claims the benefit-under 35 U.S.C. Section 119 of Spanish Utility Model Application No. U200101398, filed May 30, 2001, which is hereby incorporated by reference it its entirety into this application.

BACKGROUND OF THE INVENTION

1. Field of the Invention

The present invention relates to a magnetic drive for a scraping blade of an icing machine.

2. Description of Related Art

Machines are known which make and dispense iced drinks. These machines typically include a tub enclosing a refrigerating evaporator. The evaporator has a cylindrical shape and, to avoid the build-up of ice crystals on its surface, it is surrounded by a scraping blade, normally of helical shape and turned by a motor reducer.

These machines can differ by the use of a horizontal or a vertical evaporator and scraping blade system. In the case of the horizontal position, the motor reducer is located on a first side of the tub, preferably the rear side. A drive axle moving the blade passes through the tub wall at a watertight joint, so that the axle is enclosed in, and emerges from, the opposite side of the evaporator. The emerging end of the axle mechanically connects to a disc or a similar part supporting-the scraping blade.

This arrangement has the drawback of the beverage penetrating into the evaporator and reaching the drive axle and the watertight joint. Cleaning the axle, when it is enclosed in the evaporator, is difficult and the joint can be damaged by the presence of the beverage. In addition, cleaning the evaporator and the scraping blade becomes difficult because of the need to use tools to disassemble the scraping blade, as access to the inside of the evaporator, where the drink-impregnated drive axle is located, is not easy.

SUMMARY OF THE INVENTION

Accordingly, it is a purpose of the present invention to provide a drive device for an icing machine scraping blade that is less susceptible to damage from beverage in the device.

It is another purpose of the present invention to provide a device for powering a scraping blade that avoids the need to clean a driving axle.

It is another purpose of the present invention to provide a non-mechanical coupling to provide drive power from the drive motor to the scraping blade of an icing machine.

It is still another purpose of the present invention to provide a drive for an icing machine scraping blade which relies upon magnets to transmit power.

To satisfy these and other objects, with the present invention, the rotating axle terminates in a magnetic clutch using magnets, instead of the conventional mechanical clutch, requiring the use of tight joints that are prone to damage and loss of efficiency.

The drive includes a longitudinal axle located inside the refrigerating evaporator, with a first end coupled to a rotating motor reducer and a second, opposite end provided with a magnetic coupling or clutch. The magnetic coupling or clutch includes a cylindrical magnet, preferably facing an encircling magnet connected to the scraping blade. The combination of the evaporator and the magnetic clutch is enclosed in a watertight capsule, preferably made of plastic.

Other features and advantages of the present invention will be apparent from the following description taken in conjunction with the accompanying drawings, in which the reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF EMBODIMENTS

Figure 1:
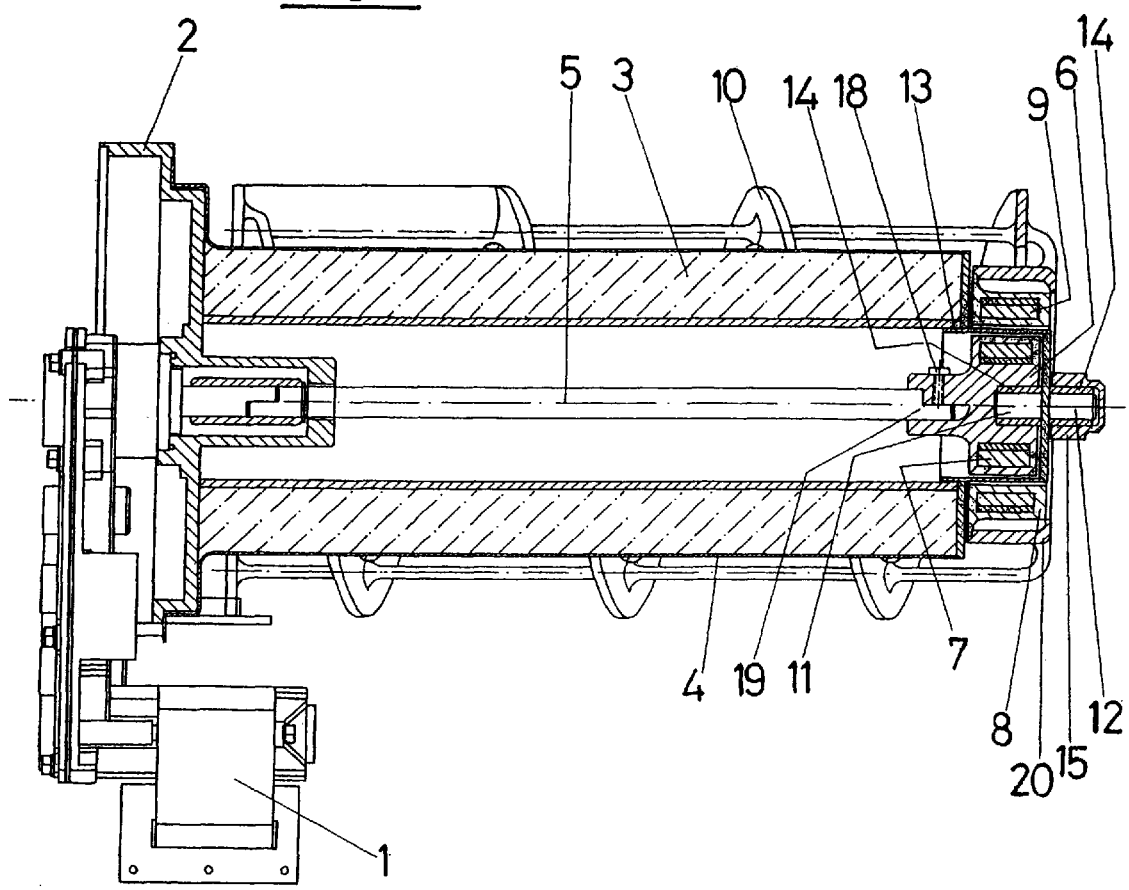
FIG. 1 is a longitudinal sectional view of the evaporator, the longitudinal axle, the magnetic drive and the helical scraping blade drive assembly.

The device has a first, rear end (left side of FIG. 1), and a second opposite, front end. The device includes a horizontal evaporator 3 extending from a rear support 2 connected to a conventional tub (not shown). To this support 2 is operatively connected a conventional motor reducer 1. The device also includes an enclosure 4 which extends from the support 2, around the evaporator 3, and is effectively watertight, as discussed below.

Figure 2:
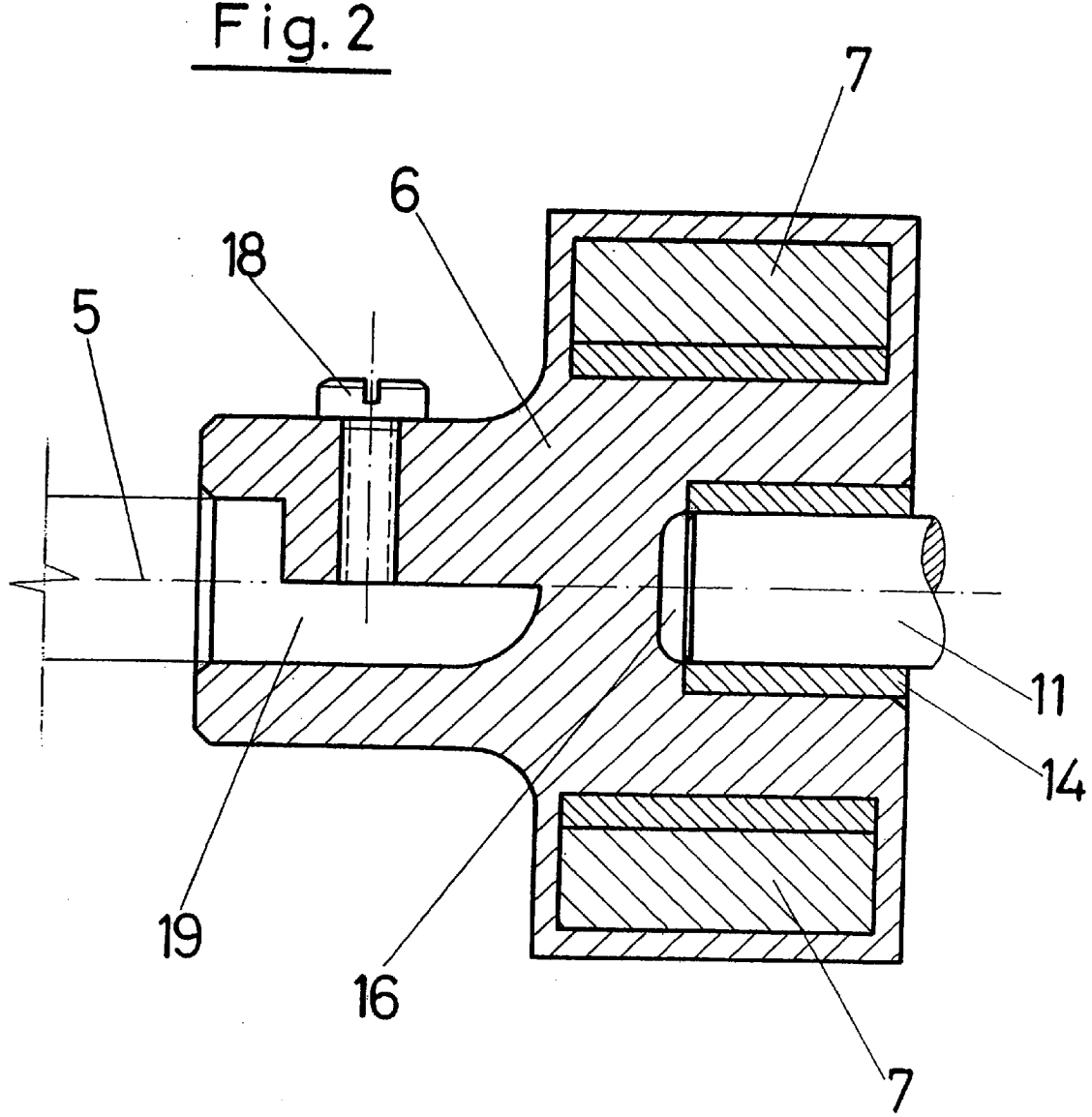
FIG. 2 is a longitudinal sectional view of the primary rotor.

The motor reducer 1 is located near the first rear end of the device and is operatively connected to a first, rear end of a longitudinal driving axle 5. The second, opposite end of the axle 5 fixedly receives a primary rotor 6 (FIG. 2) via, e.g., a mechanical fastener 19 and a screw 18 lodged in a threaded hole 17 at the first, rear end of the primary rotor 6.

The second, opposite end of the primary rotor 6 receives, in a hole 16, with the interposition of a friction bush 14, a stub portion 11 coaxially emerging from an inside face of an intermediate cylinder 13, as described below, of the enclosure 4. The primary rotor 6 is supported on the internal supporting stub portion 11 to maintain its rotating stability.

The primary rotor 6 is preferably cylindrical, is made of ferro-magnetic material, and includes internally a magnet 7, i.e., one or more magnets with their magnetic poles oriented outwards. The magnet can be, e.g., a single cylindrical magnet or a plurality of radially oriented magnets.

The intermediate cylinder 13 is made of a magnetically permeable material and is made watertight around the primary rotor 6. The intermediate cylinder 13 receives a stub having opposing portions 11, 12 extending therefrom.

Thus the enclosure 4 includes the intermediate cylinder 13 that has at its axis a double supporting stub. The second end of the driving axle 5 and the primary rotor 6 are located inside this intermediate cylinder 13.

Figure 3:
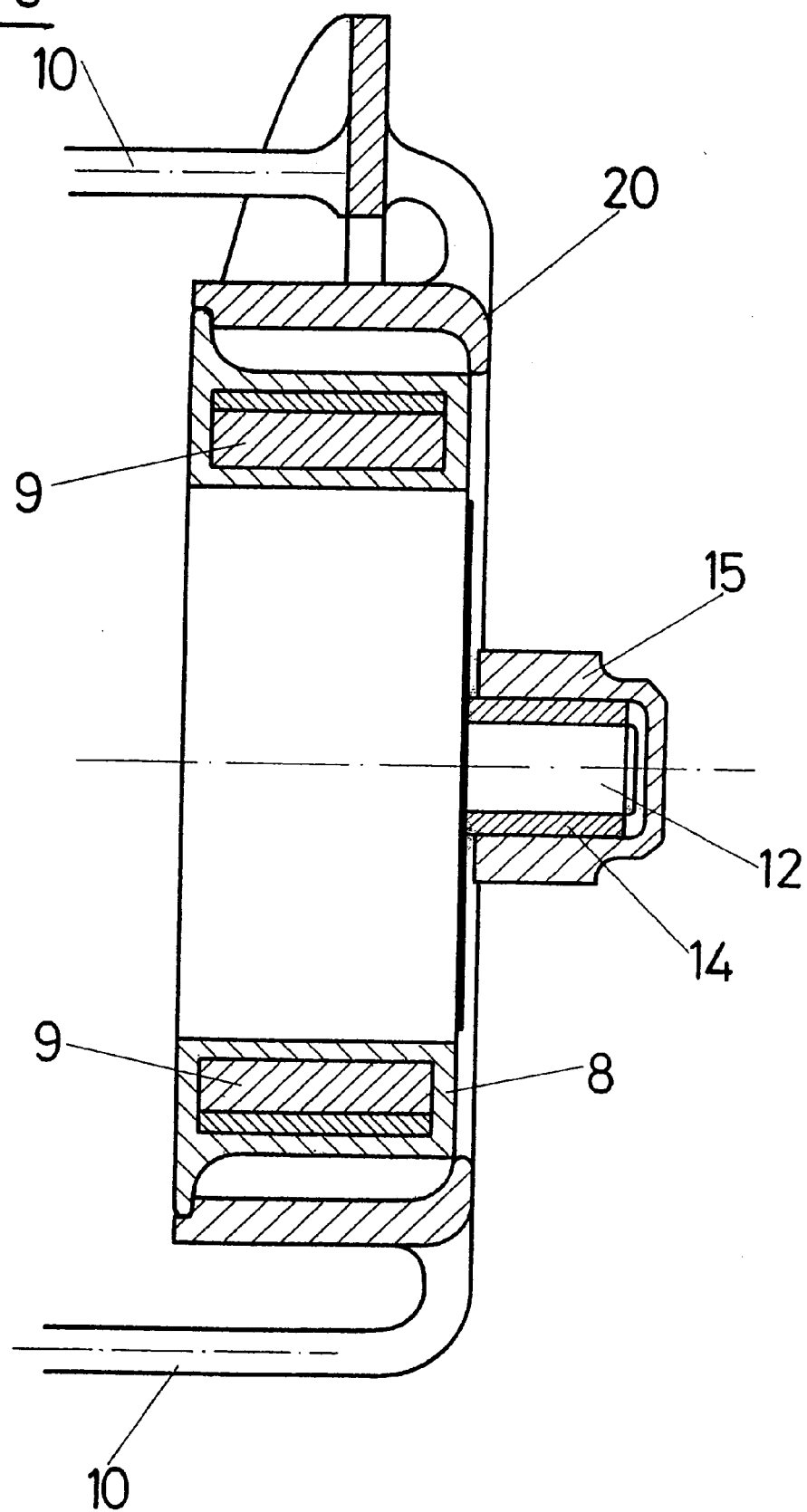
FIG. 3 is a longitudinal sectional view of the secondary rotor.

A secondary rotor 8 (FIG. 3) is arranged coaxially and around the primary rotor 6 and is fixedly connected to the scraping blade 10. The secondary rotor 8 is also magnetic.

That is, the secondary rotor 8 (FIG. 3), shown ring-shaped, is arranged around the primary rotor 6 and the cylinder 13, and bears a cover 20 connected to the helical scraping blade 10, which extends along and around the evaporator 3 and the enclosure 4. The front end of the enclosure 4 has, coaxially with the axle 5, the stub portion 12 emerging outwards and coupled to a support 15 using a friction bush 14. Support 15 is joined to the helical scraping blade 10 by the cover 20.

The secondary rotor 8, like the primary rotor 6, includes an internal magnet 9, e.g., one cylindrical or several radially placed magnets with their poles facing the poles of the magnets 7 of the primary rotor 6. The secondary rotor 8 is supported by the stub portion 12 extending from the intermediate cylinder 13 of the enclosure 4.

The axle 5, moved by the motor reducer 1, rotates the primary rotor 6, therefore rotating the magnetic fields of the magnets 7, 9 therein. The rotation of these magnetic fields produces the rotation of the secondary rotor 8, because the magnet 9 is magnetically coupled to the magnet 7 across the watertight intermediate cylinder 13 which is permeable to the magnetic fields. As the secondary rotor 8 turns, the scraping blade slides over the evaporator 3 surface and eliminates ice crystals.

This magnetic drive keeps the evaporator 3 and axle 5 watertight and isolated from the beverage. The mechanical drive power from the motor reducer 1 is transmitted magnetically to the scraping blade 10 across the watertight enclosure 4.

The foregoing is considered illustrative only of the principles of the invention. Further, since numerous modifications and changes will readily occur to those skilled in the art, it not desired to limit the invention to the exact construction and operation shown and described. Accordingly, all suitable modifications and equivalents may be resorted to that fall within the scope of the invention and the appended claims.

What is claimed is:

1. A device, comprising:
   an evaporator having a first end and a second end;
   an axle extending through the evaporator and having a first end and a second end, wherein the first end is connected to and driven by a motor;
   a scraping blade extending around the evaporator;
   a magnetic clutch for connecting the second end of the axle and the scraping blade, said clutch including a primary rotor connected to the axle and having a magnet and a secondary rotor connected to the blade and having a magnet; and
   a watertight enclosure made of magnetically permeable material, and located at the second end of the evaporator, and between the primary and secondary rotors.

2. The claim according to claim 1, wherein the magnetic clutch includes a primary rotor and a secondary rotor are arranged coaxially and concentrically.

3. The device according to claim 1, wherein the evaporator is oriented substantially horizontally.

4. The device according to claim 1, wherein the scraping blade is helical.

5. The device according to claim 1, wherein each magnet is a plurality of magnets, each having a pole.

6. The device according to claim 1, wherein the primary rotor comprises a hole for receiving a stub extending from the enclosure.

7. The device according to claim 1, wherein the enclosure includes an intermediate cylinder extending between the primary rotor and the secondary rotor.

8. The device according to claim 5, wherein the poles of the plurality of magnets of the secondary rotor face the poles of plurality of magnets of the primary rotor.

9. The device according to claim 6, wherein a cover connects the secondary rotor to the scraping blade.

10. The device according to claim 9, wherein the cover includes a support for receiving the stub.

11. A device, comprising:
    an evaporator having a first end and a second end;
    an axle extending through the evaporator and having a first end and a second end, wherein the first end is connected to and driven by a motor;
    a scraping blade extending around the evaporator;
    a magnetic clutch for connecting the second end of the axle and the scraping blade, said clutch including a cylindrical primary rotor connected to the axle and having a magnet and a secondary cylindrical rotor connected to the blade and having a magnet, wherein the primary and secondary rotors are arranged coaxially and concentrically, and wherein each rotor includes a magnet; and
    a watertight enclosure made of magnetically permeable material, and located at the second end of the evaporator, and between the primary and secondary rotors.

12. The device according to claim 11, wherein the evaporator is oriented substantially horizontally.

13. The device according to claim 11, wherein the primary rotor further comprises a hole for receiving a stub extending from the enclosure.

14. The device according to claim 11, wherein the enclosure includes an intermediate cylinder extending between the primary rotor and the secondary rotor.

15. The device according to claim 11, wherein each magnet is a plurality of magnets, each having a pole, and the poles of the plurality of magnets of the secondary rotor face a corresponding pole of the plurality of magnets of the primary rotor.

16. The device according to claim 11, wherein a cover connects the secondary rotor and the scraping blade.

17. A device, comprising:
    an evaporator having a first end and a second end, the first end being coupled to a support;
    a longitudinal axle extending through the evaporator and having a first end and a second end, wherein the first end is connected to and driven by a motor;
    a scraping blade against the evaporator;
    a magnetic clutch for connecting the axle and the scraping blade; and
    a watertight enclosure made of magnetically permeable material, and extending from the support to the second end of the evaporator and the magnetic clutch,
    wherein the enclosure includes an intermediate cylinder extending between the primary rotor and the secondary rotor.

18. The device according to claim 17, wherein the magnetic clutch includes a primary rotor and a secondary rotor arranged coaxially, each of which rotors includes a magnet.

19. The device according to claim 18, wherein each magnet is a plurality of magnets, each having a pole, and the poles of the plurality of magnets of the secondary rotor face a corresponding pole of the plurality of magnets of the primary rotor.

* * * * *